(12) United States Patent
Wilson et al.

(10) Patent No.: US 7,963,486 B2
(45) Date of Patent: Jun. 21, 2011

(54) CABLE MANAGEMENT ASSEMBLY WITH VARIABLY SPACED PROJECTIONS

(75) Inventors: Craig Wilson, Bothell, WA (US); Frank Chin-Hwan Kim, Woodinville, WA (US); Brian Groenig, Bothell, WA (US)

(73) Assignee: Leviton Manufacturing Co., Ltd., Melville, NY (US)

( * ) Notice: Subject to any disclaimer, the term of this patent is extended or adjusted under 35 U.S.C. 154(b) by 332 days.

(21) Appl. No.: 12/031,648

(22) Filed: Feb. 14, 2008

(65) Prior Publication Data
US 2009/0206217 A1   Aug. 20, 2009

(51) Int. Cl.
F16L 3/00 (2006.01)
A47F 7/00 (2006.01)

(52) U.S. Cl. ........... 248/49; 248/68.1; 211/26; 174/101; 174/68.3; 174/72 A; 361/829; 361/826

(58) Field of Classification Search ........... 248/49, 248/68.1, 58; 439/719; 211/26; 361/826, 361/829, 827, 825; 385/134, 135; 174/97, 174/68.3, 101, 481, 72 A
See application file for complete search history.

(56) References Cited

U.S. PATENT DOCUMENTS

| | | | | |
|---|---|---|---|---|
| 3,890,459 A | * | 6/1975 | Caveney | 174/101 |
| 3,968,322 A | * | 7/1976 | Taylor | 174/72 A |
| 4,641,225 A | * | 2/1987 | Reichle | 361/829 |
| 5,765,698 A | | 6/1998 | Bullivant | |
| 5,921,402 A | | 7/1999 | Magenheimer | |
| 6,102,214 A | * | 8/2000 | Mendoza | 211/26 |
| 6,427,952 B2 | | 8/2002 | Caveney et al. | |
| 6,467,633 B1 | * | 10/2002 | Mendoza | 211/26 |
| 6,489,565 B1 | | 12/2002 | Krietzman et al. | |
| D473,449 S | | 4/2003 | Wu et al. | |
| 6,572,058 B1 | | 6/2003 | Gerardo | |
| 6,605,782 B1 | | 8/2003 | Krietzman et al. | |
| 6,636,680 B2 | | 10/2003 | Wu et al. | |
| 6,766,093 B2 | | 7/2004 | McGrath et al. | |
| 6,946,605 B2 | | 9/2005 | Levesque et al. | |
| 7,026,553 B2 | * | 4/2006 | Levesque et al. | 174/100 |
| 7,119,282 B2 | | 10/2006 | Krietzman et al. | |
| 7,259,325 B2 | | 8/2007 | Pincu | |

OTHER PUBLICATIONS

Panduit; Vertical Cable Management System WMPV20; Spec Sheet; 2 pages; www.panduit.com/ncg; Panduit Corp. 2001; USA.
Chatsworth Products, Inc.; Enhanced Cable Management 13169-13171; Product Data Sheet; 2 pages; www. chatsworth.com; Apr. 2006; USA.

* cited by examiner

*Primary Examiner* — Anita M King
(74) *Attorney, Agent, or Firm* — Davis Wright Tremaine LLP; George C. Rondeau, Jr.; Heather M. Colburn

(57) ABSTRACT

A variably spaced cable management assembly according to the present invention is used in conjunction with a conventional equipment rack to route cables between and otherwise to or from equipment stored in the conventional rack. Implementations of the variably spaced assembly include various elongated guide members projecting from a rear wall of the variably spaced assembly interspaced in juxtaposition with one another by a variable amount.

28 Claims, 13 Drawing Sheets

US 7,963,486 B2

CABLE MANAGEMENT ASSEMBLY WITH VARIABLY SPACED PROJECTIONS

BACKGROUND OF THE INVENTION

1. Field of the Invention

The present invention relates generally to the field of equipment racks.

2. Description of the Related Art

Racks, frames, cabinets, and the like (referred to generally herein as "racks") support computer and other electronic equipment, whereas raceways route cables, wires, and the like (generally referred to hereinafter as "cables") to and from the equipment in racks. Vertical raceways and other structures route cables vertically through or adjacent to equipment racks. Such structures may be used to route cables vertically to equipment mounted or otherwise supported by a rack from other equipment in the rack, from an overhead or underfloor raceway, or the like. These cables are generally routed in the vertical direction to a point laterally adjacent to the desired equipment and then routed in the horizontal direction to the desired equipment.

Cables may be routed by positioning the cables around elongated guide members, such as having finger-like projections. Conventional projections are regularly spaced to conform to conventional belief that the regularity of standardized rack dimensions dictates a regularity of spacing between the elongated guide members.

BRIEF DESCRIPTION OF THE SEVERAL VIEWS OF THE DRAWING(S)

DETAILED DESCRIPTION OF THE INVENTION

A variably spaced cable management assembly according to the present invention is used in conjunction with a conventional equipment rack to route cables between and otherwise to or from equipment stored in the conventional rack. Implementations of the variably spaced assembly include various elongated guide members projecting from a rear wall of the variably spaced assembly fashioned somewhat like teeth of a comb although spaced from each other to variable degree. As cables are routed through spaces of variable dimension between the elongated guide members, the elongated guide members are used to position and retain the cables.

Figure 1:
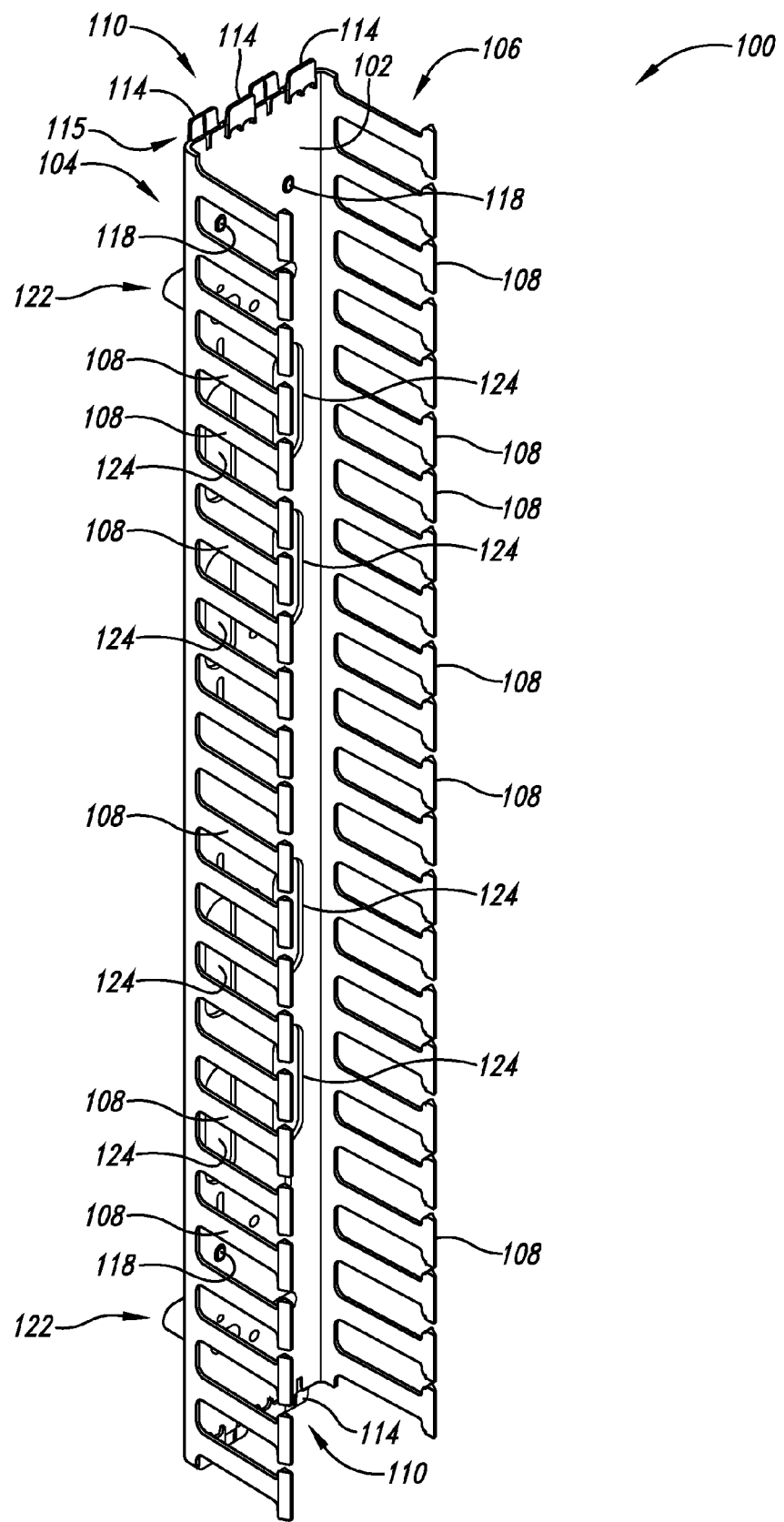
FIG. 1 is a front perspective view of a variably spaced assembly according to the present invention.

An implementation of a variably spaced cable management assembly 100 according to the present invention is shown in FIG. 1 as having a rear wall 102, and a first column 104 and a second column 106 of elongated guide members 108 projecting forwardly therefrom. The elongated guide members 108 of the first column 104 are shown interspaced in juxtaposition along a first side between the top end and the bottom end of the rear wall 102. The elongated guide members 108 of the second column 106 are shown interspaced in juxtaposition along a second side between the top end and the bottom end of the rear wall 102. At each end of the rear wall 102 is a vertical engagement portion 110, each used to vertically stack and couple two of the variably spaced assemblies 100 together.

Figure 2:
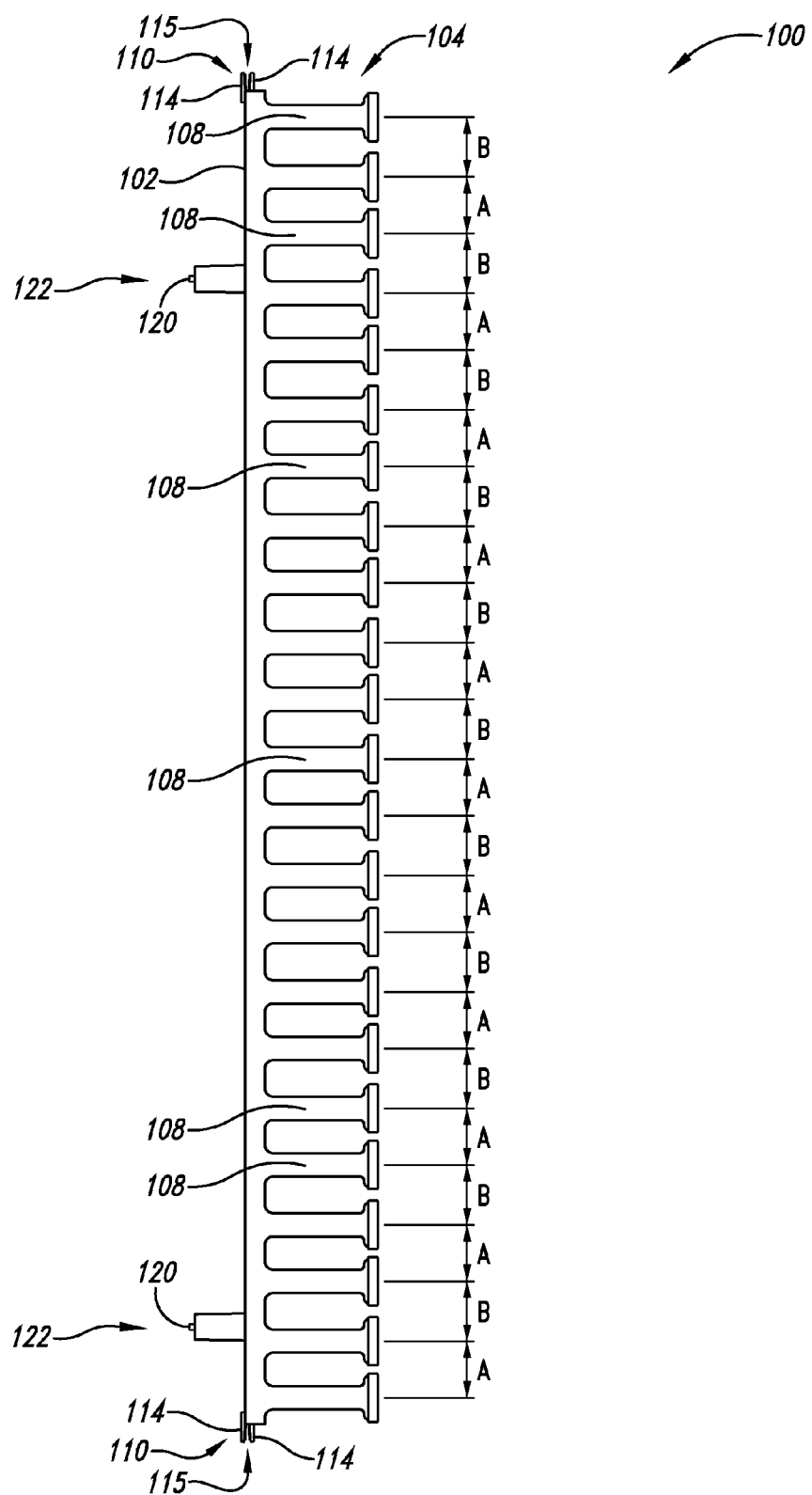
FIG. 2 is a side elevational view of a version of the variably spaced assembly of FIG. 1 having alternately variably spaced projections.
Figure 3:
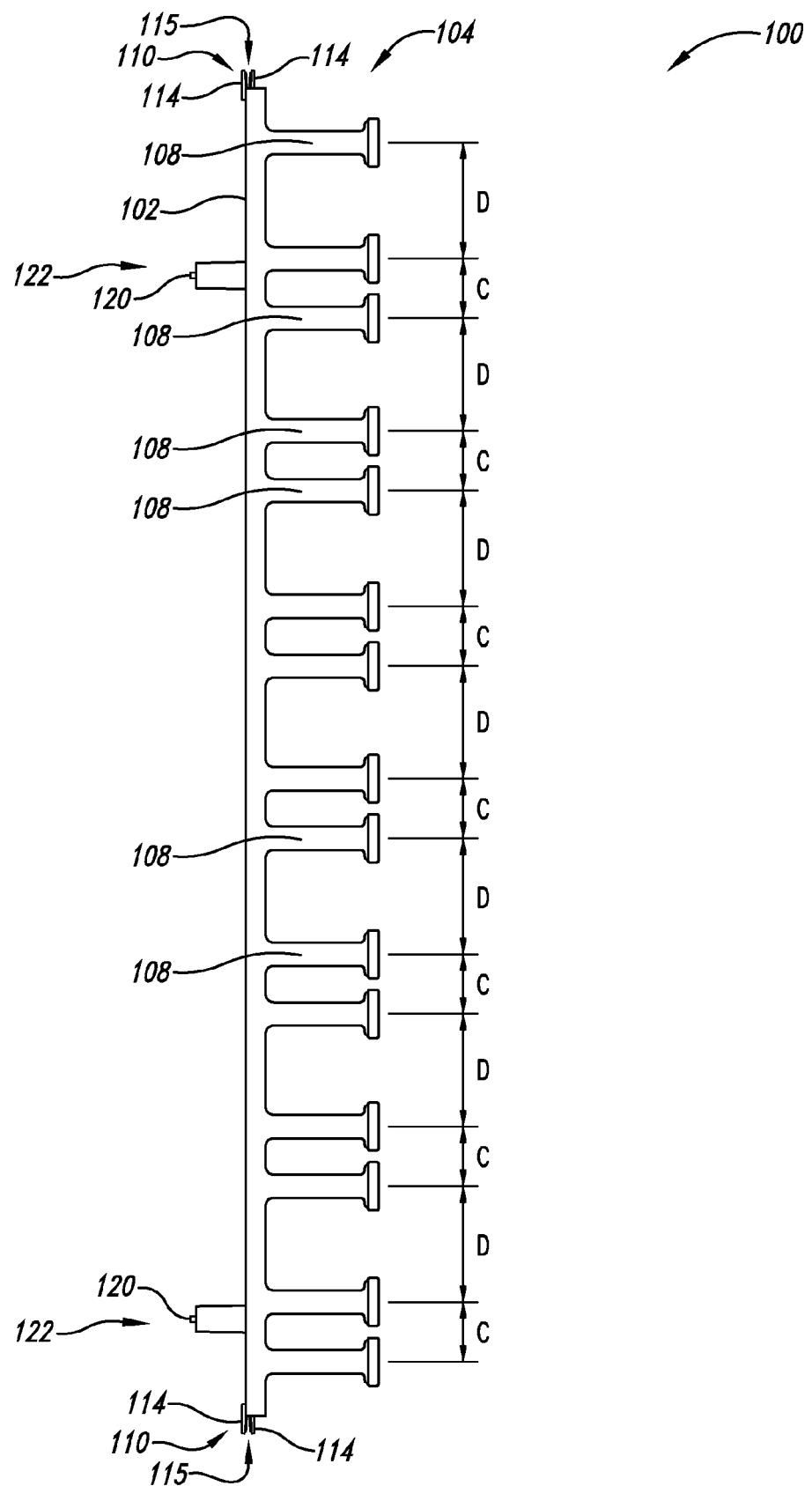
FIG. 3 is a side elevational view of a version of the variably spaced assembly of FIG. 1 having alternately variably spaced projections.

Versions of the variably spaced assembly 100 are shown in FIG. 2 and FIG. 3. In FIG. 2, the variably spaced assembly 100 is shown with the elongated guide members 108 having variable spacing between each other that alternate between being spaced apart an "A" amount and a "B" amount, wherein the "B" amount is greater than the "A" amount. In FIG. 3, the variably spaced assembly 100 is shown with the elongated guide members 108 having variable spacing between each other that alternate between being spaced apart a "C" amount and a "D" amount. In at least some of the implementations, the variable spacing is sized to still allow for placement of equipment with standard rack unit dimensions into the variably spaced assembly 100. In some implementations, the "A" amount can be equal to 1.70 inches and the "B" amount can be equal to 1.80 inches. As depicted in FIG. 3, in other, implementations, there can be greater discrepancies between the "C" amount and the "D" amount.

Figure 4:
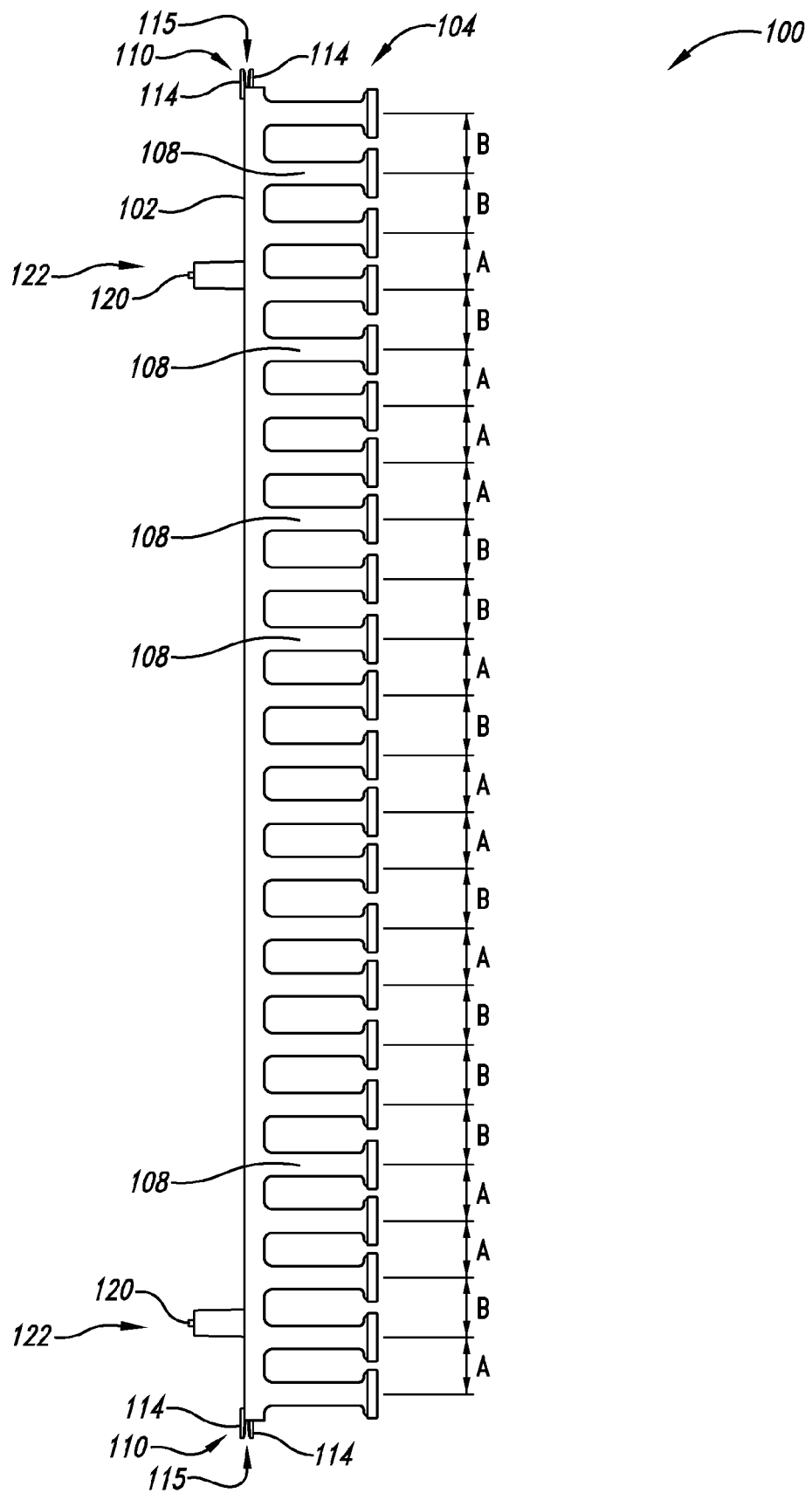
FIG. 4 is a side elevational view of a version of the variably spaced assembly of FIG. 1 having irregularly variably spaced projections.
Figure 5:
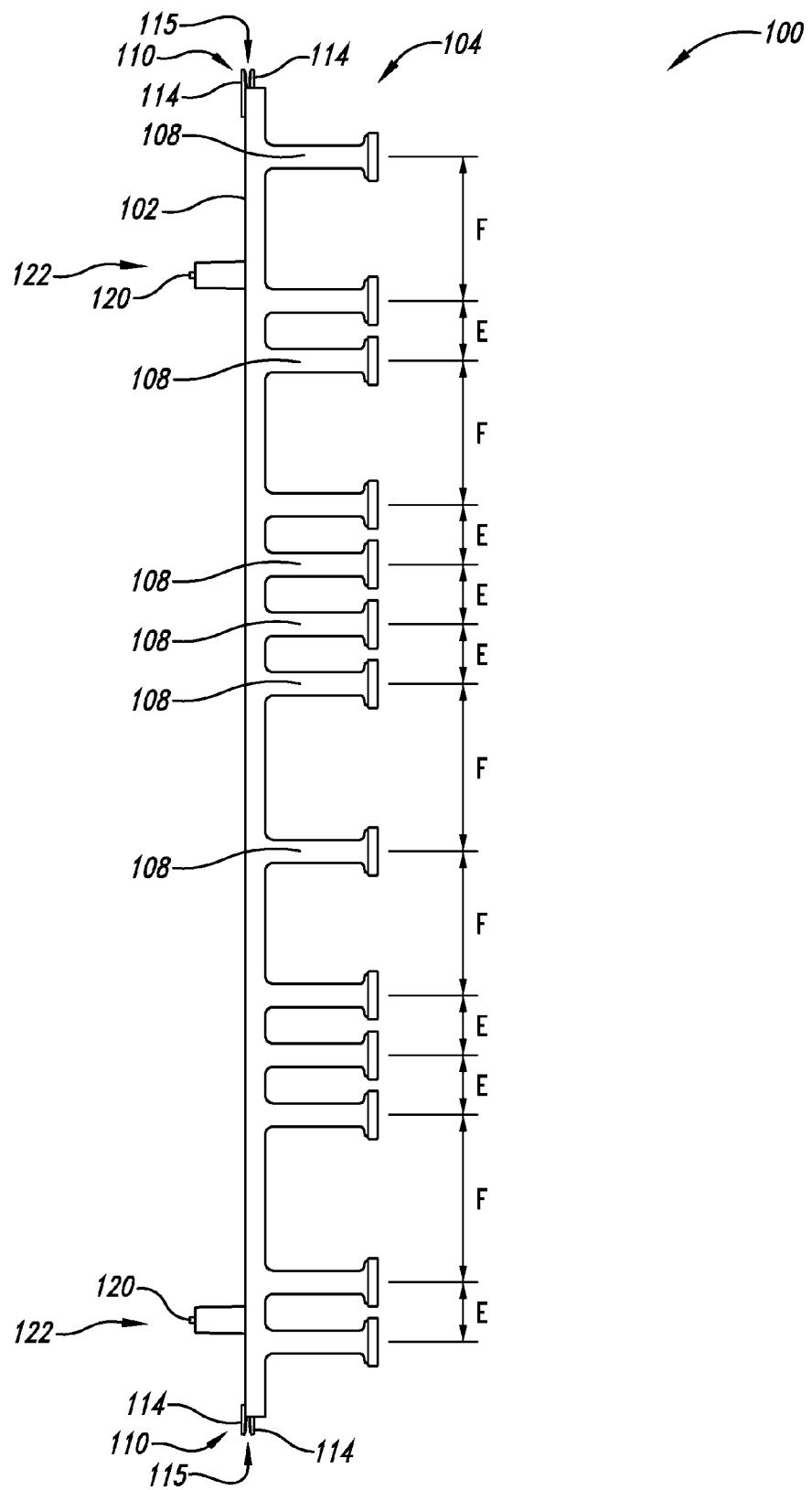
FIG. 5 is a side elevational view of a version of the variably spaced assembly of FIG. 1 having irregularly variably spaced projections.

Versions of the variably spaced assembly 100 are shown in FIG. 4 and FIG. 5. In FIG. 4, the variably spaced assembly 100 is shown with the elongated guide members 108 having variable spacing between each other by an irregular sequential occurrence of being spaced apart an "A" amount and a "B" amount, wherein the "B" amount is greater than the "A" amount. In FIG. 5, the variably spaced assembly 100 is shown with the elongated guide members 108 having variable spacing between each other by an irregular sequential occurrence of being spaced apart an "E" amount and a "F" amount.

Figure 6:
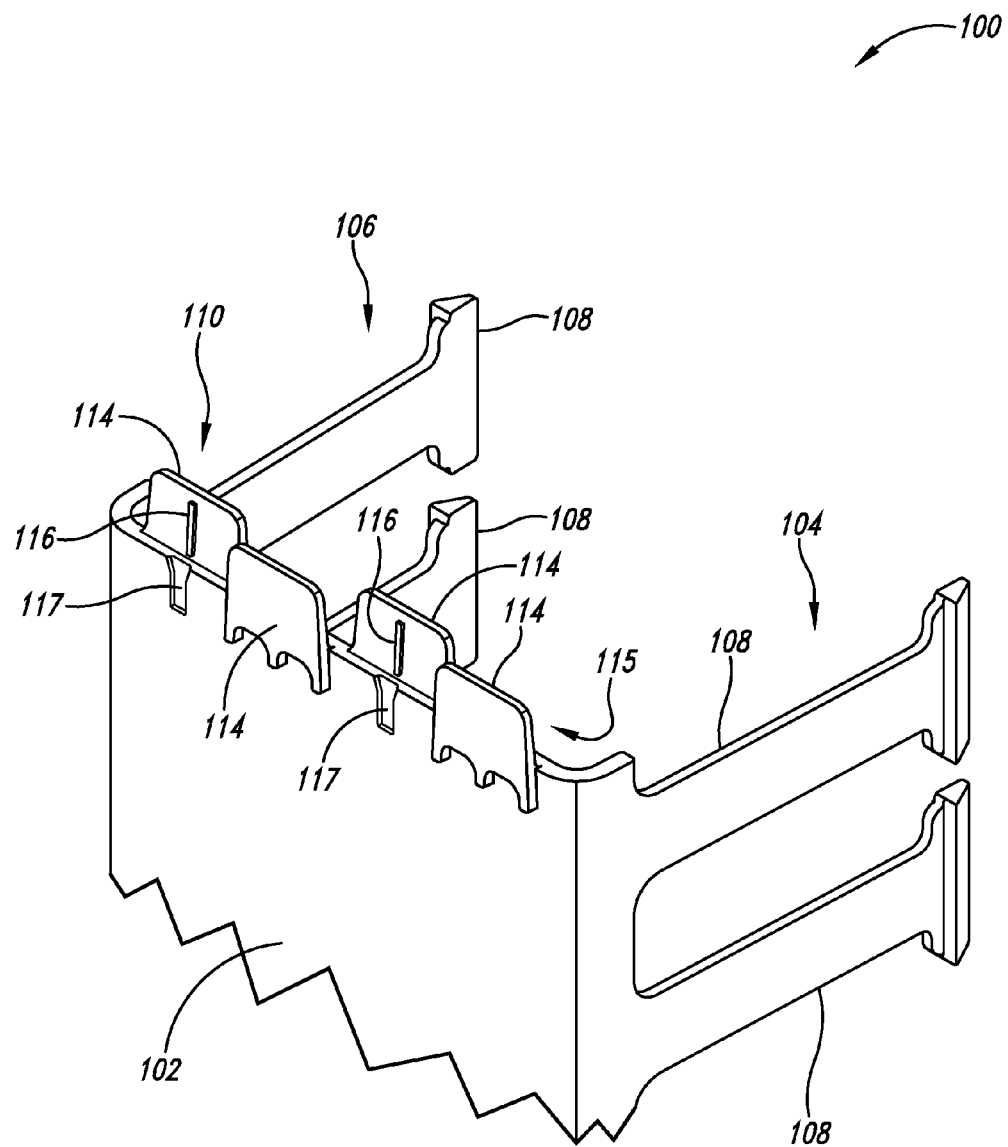
FIG. 6 is an enlarged fragmentary rear perspective view of the variably spaced assembly of FIG. 1 showing a vertical engagement portion.
Figure 7:
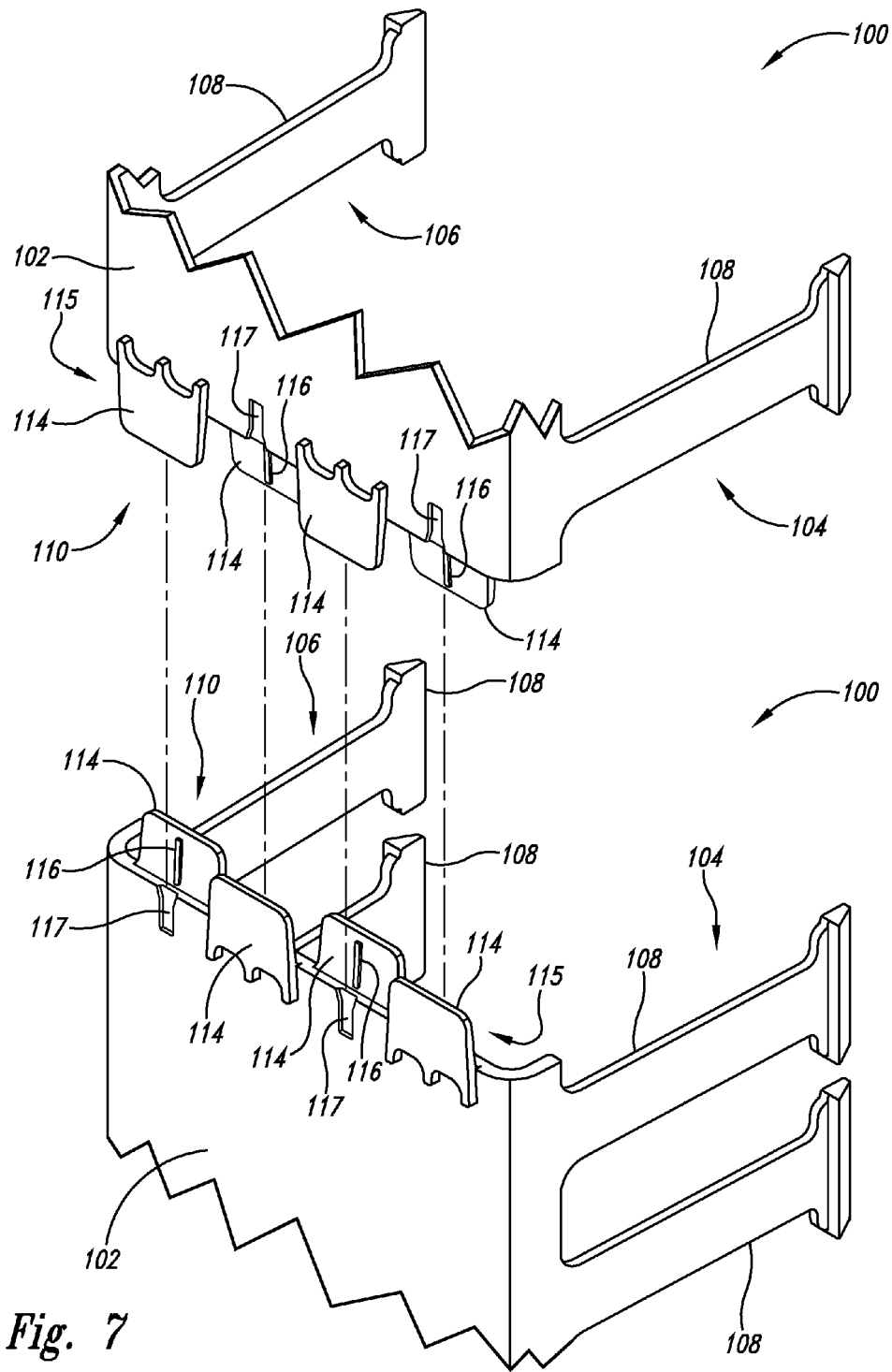
FIG. 7 is an enlarged fragmentary rear perspective view of two of the variably spaced assemblies of FIG. 1 prior to being coupled together vertically through the vertical engagement portion.
Figure 8:
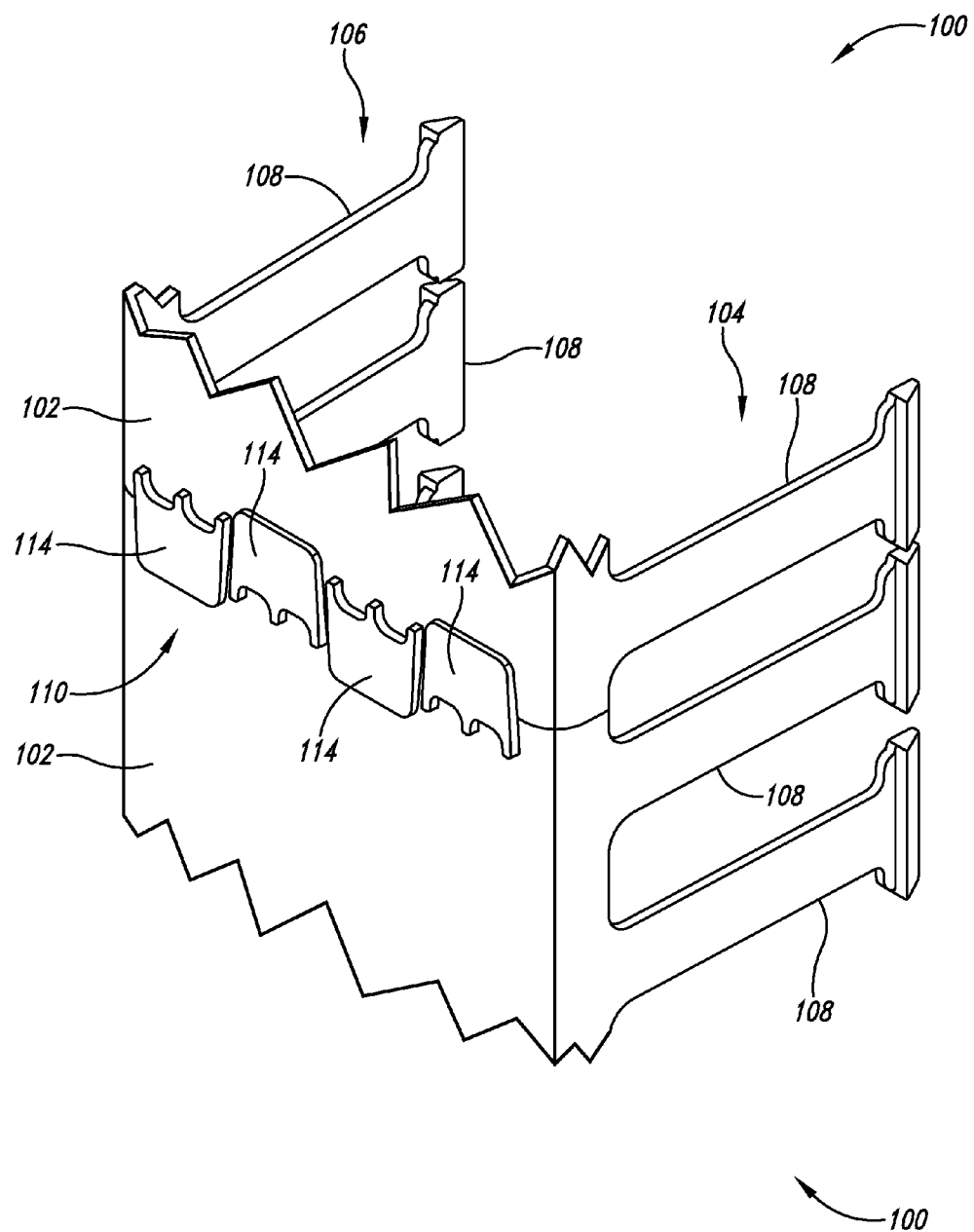
FIG. 8 is an enlarged fragmentary rear perspective view of the two variably spaced assemblies of FIG. 1 shown coupled together vertically through the vertical engagement portion.

Better shown in FIGS. 6-8, the vertical engagement portions 110 each have a plurality of teeth 114 alternatingly positioned to form a channel 115 therebetween to receive the rear wall 102 along with teeth of another variably spaced assembly 100 to be vertically coupled. The teeth 114 are arranged at the top end at alternate positions from the teeth at the bottom end. Each of the teeth 114 have an elongated vertical protrusion 116 that is positioned to engage with a corresponding groove 117 on the rear wall 102 of the other variably spaced assembly 100 to be vertically coupled.

Figure 9:
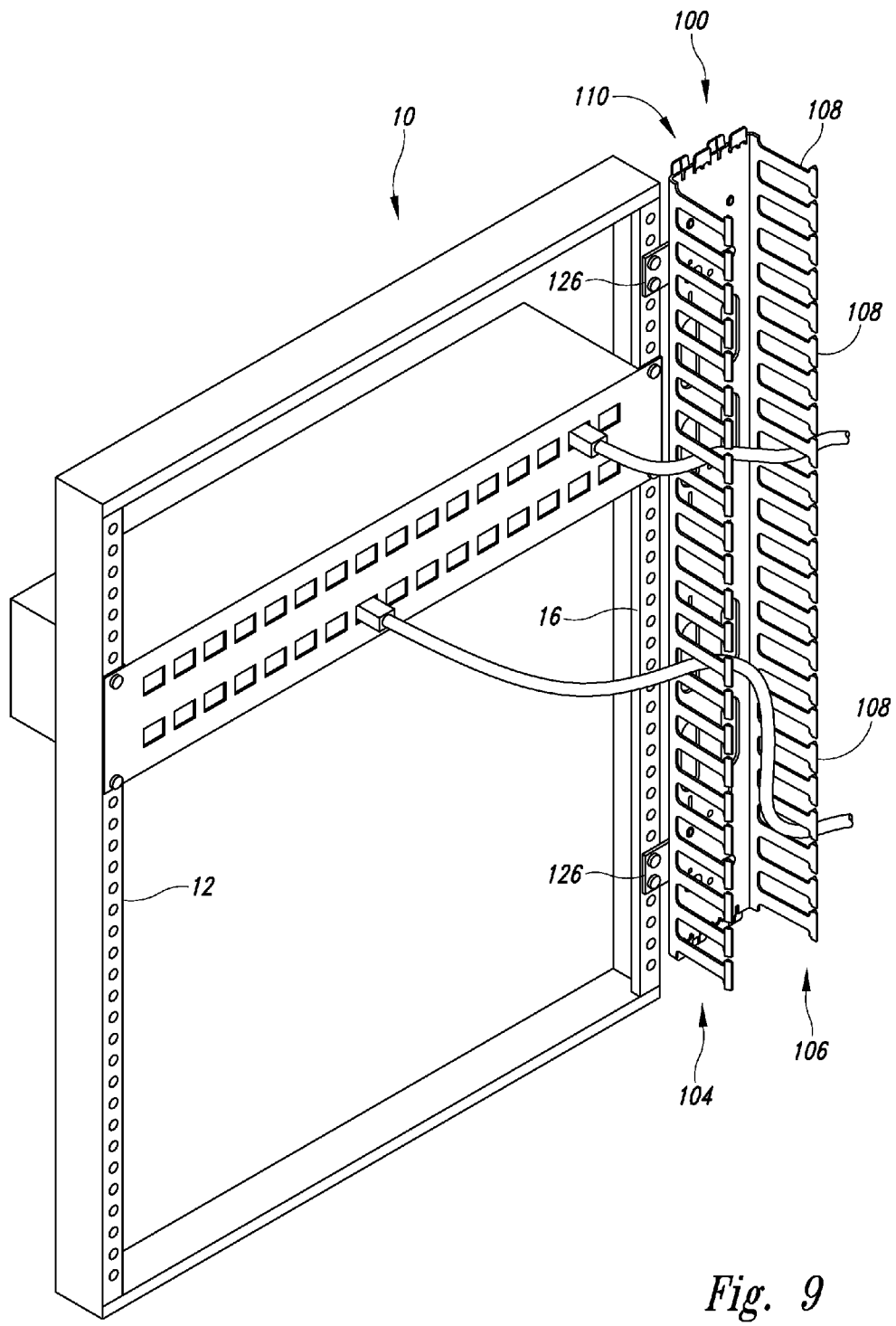
FIG. 9 is a front perspective view of a conventional rack with the variably spaced cable management assembly of FIG. 1.

As shown in FIG. 9, the variably spaced assembly 100 can be positioned adjacent and along a vertical dimension of a conventional equipment rack 10 through attachment with brackets 126 to a first one of the support posts 12 of the equipment rack. The equipment rack 10 is depicted as having equipment attached thereto extending between the first support post 12 and a second support post 16.

Figure 10:
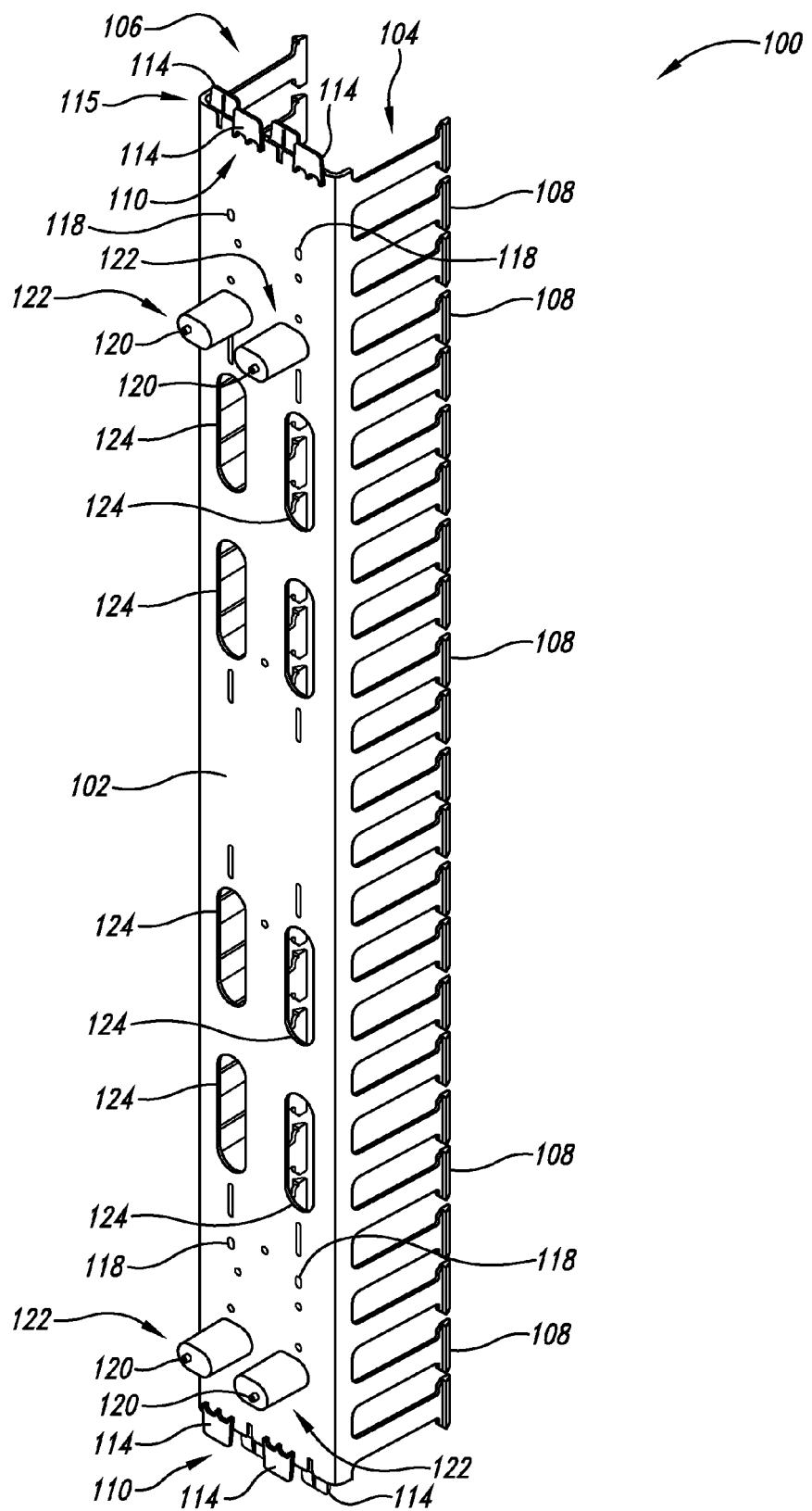
FIG. 10 is a rear perspective view of the variably spaced assembly of FIG. 1.
Figure 11:
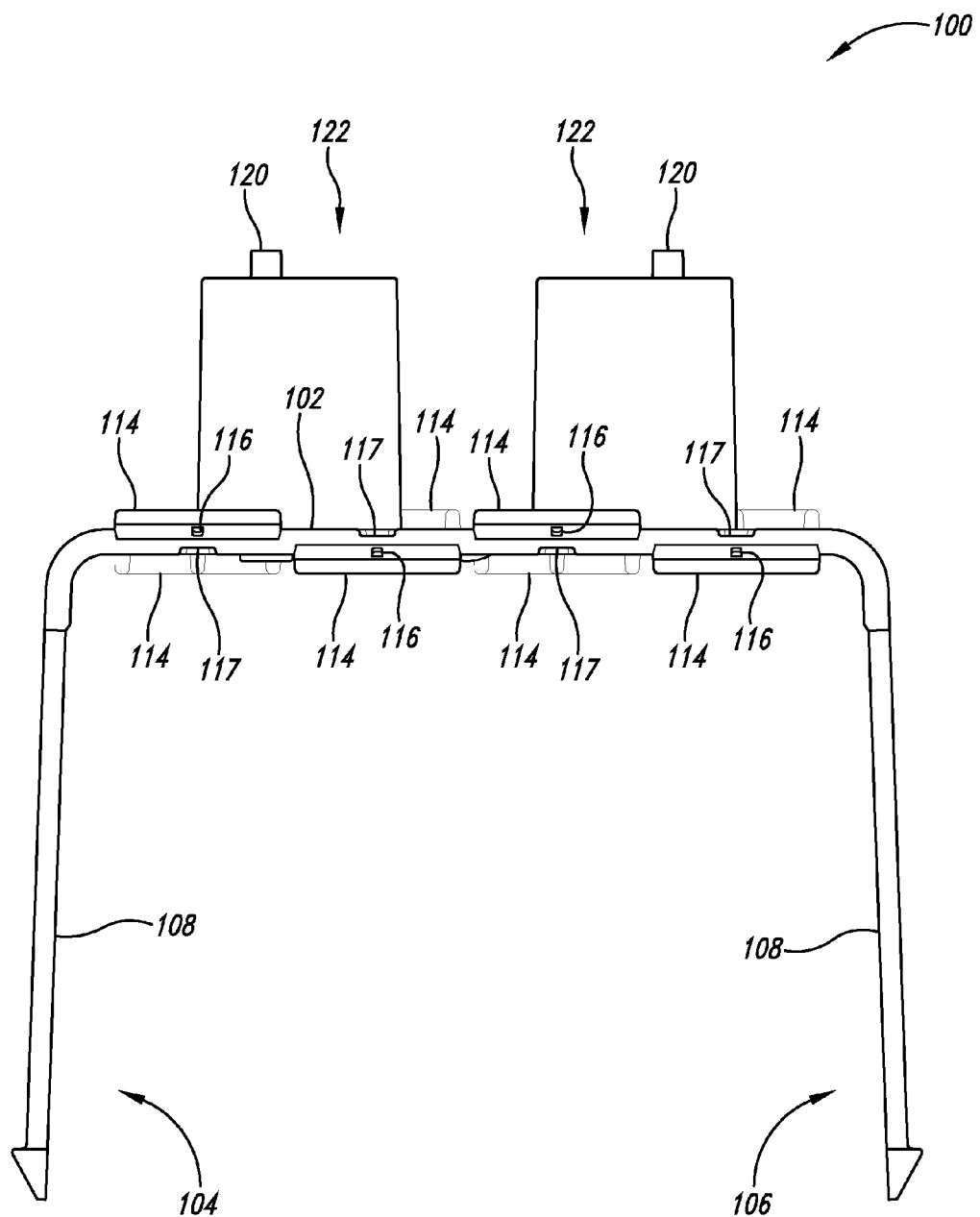
FIG. 11 is a top plan view of the variably spaced assembly of FIG. 1.
Figure 12:
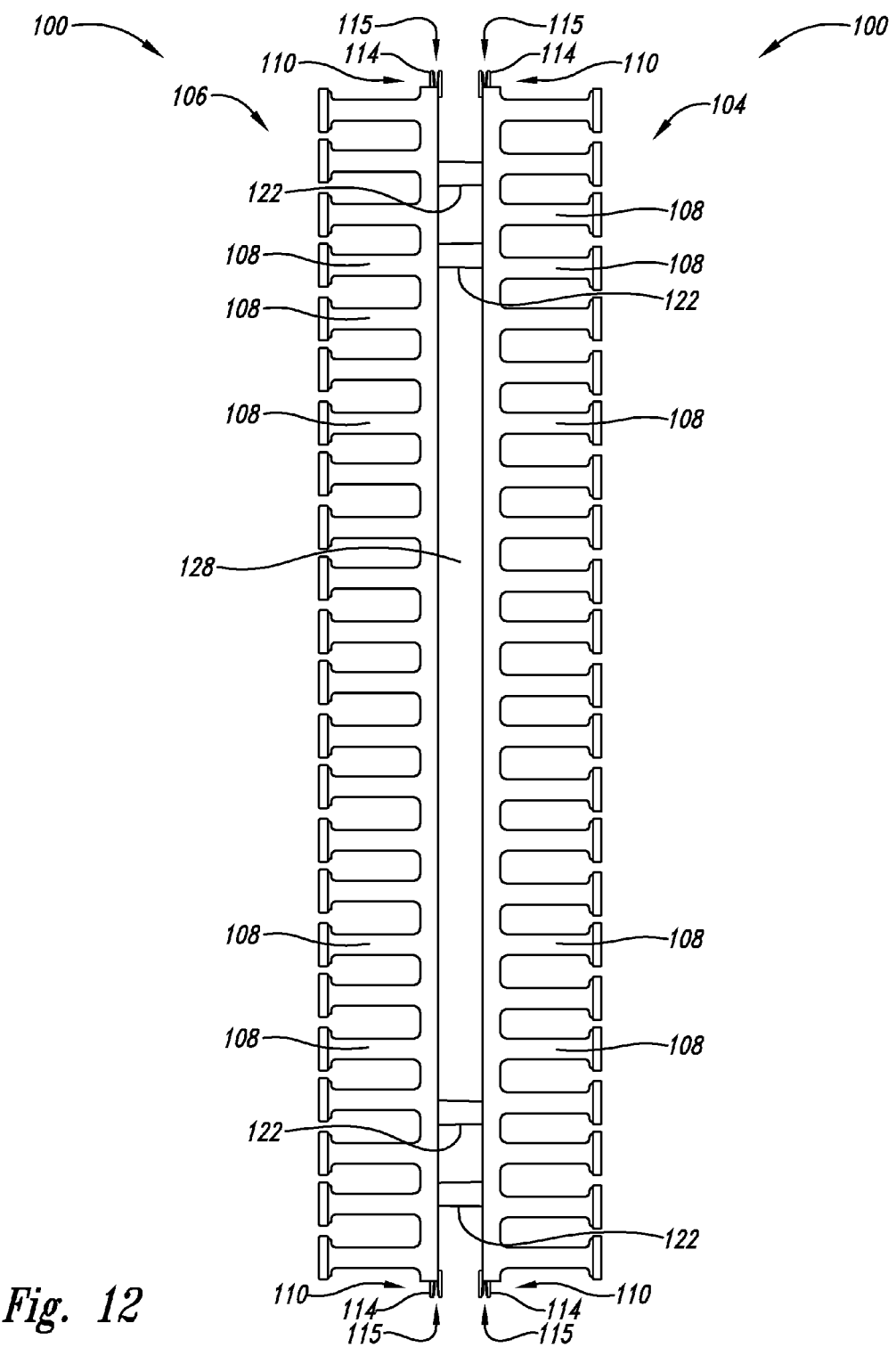
FIG. 12 is a side elevational view showing two of the variably spaced assemblies of FIG. 1 being coupled together back-to-back horizontally through a horizontal engagement portion.
Figure 13:
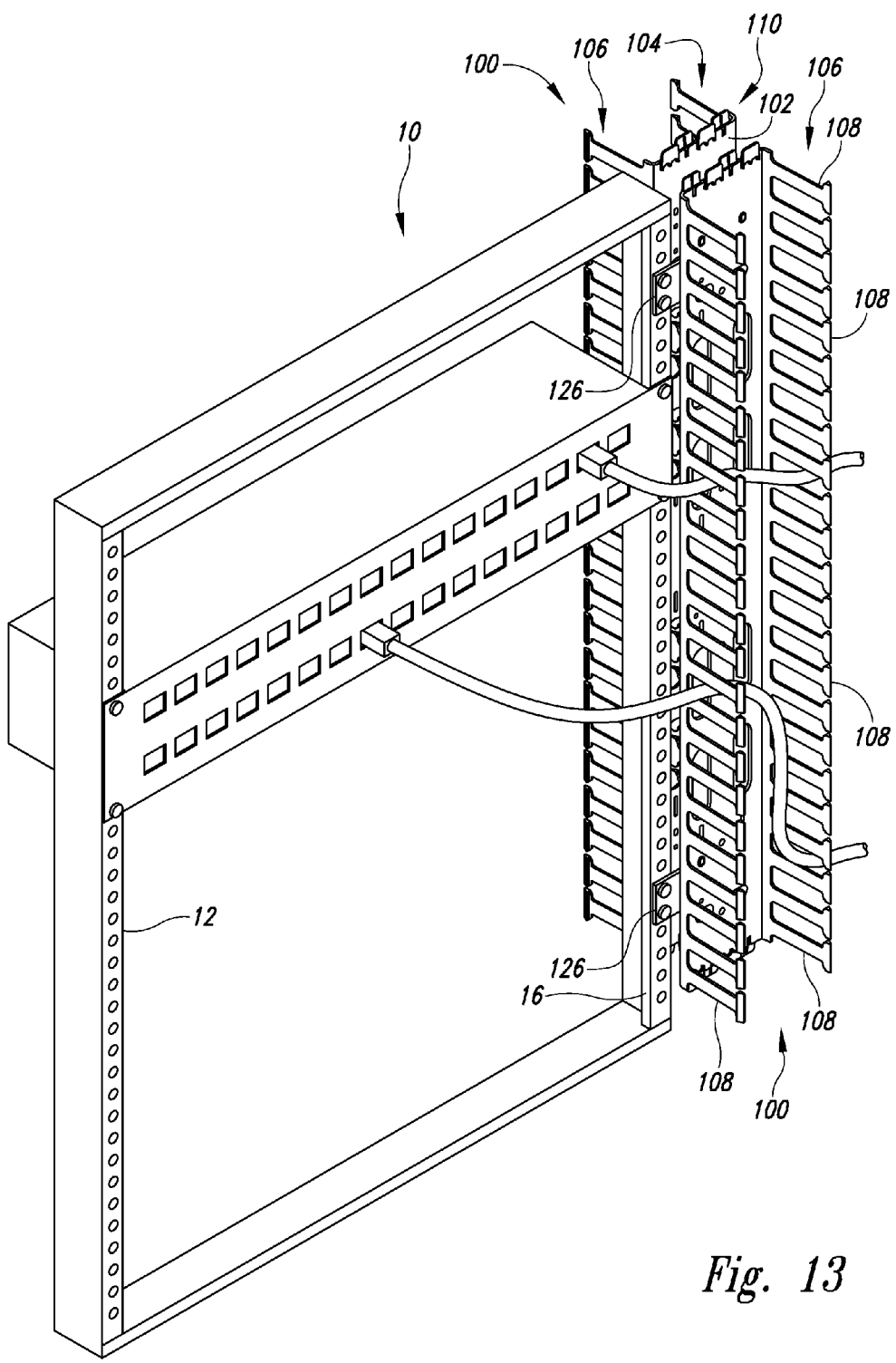
FIG. 13 is a perspective view of the two horizontally coupled variably spaced assemblies of FIG. 12 further coupled to the conventional rack.

As shown in FIG. 10 and FIG. 11, the rear wall 102 has apertures 118 that each receives a pin 120 of a horizontal engagement portion 122 extending rearward from the rear wall of another one of the variably spaced assemblies 100 for horizontal coupling between the two variably spaced assemblies. The rear wall 102 also has apertures 124 to provide cable access as shown in FIG. 12; two of the variably spaced assemblies 100 are horizontally coupled together through their respective horizontal engagement portions 122 to form a raceway area 128 therebetween. The horizontally coupled pair of the variably spaced assemblies 100 is further shown in FIG. 13 as being affixed adjacent to the conventional communication rack 10.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiments, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

The invention claimed is:

1. An assembly for coupling with an equipment rack along a vertical dimension of the equipment rack, the assembly comprising:
    a wall having a first end and a second end with a first side extending therebetween and an opposite second side extending therebetween;
    a first plurality of elongated guide members being interspaced in juxtaposition along the first side of the wall and projecting from the wall, adjacent ones of the first plurality of elongated guide members being spaced apart by a first plurality of spaces having varied dimensions;
    a second plurality of elongated guide members being interspaced in juxtaposition along the second side of the wall and projecting from the wall, adjacent ones of the second plurality of elongated guide members being spaced apart by a second plurality of spaces having varied dimensions;
    a first plurality of teeth alternatingly positioned along the first end to form a first channel configured to receive a second end of a first like assembly; and
    a second plurality of teeth alternatingly positioned along the second end to form a second channel configured to receive a first end of a second like assembly.

2. The assembly of claim 1 wherein a first portion of the first plurality of elongated guide members are each spaced apart from an adjacent one of the first plurality of elongated guide members by a first amount and a second portion of the first plurality of elongated guide members are each spaced apart from an adjacent one of the first plurality of elongated guide members by a second amount, the first amount being different than the second amount; and
    a first portion of the second plurality of elongated guide members are each spaced apart from an adjacent one of the second plurality of elongated guide members by the first amount and a second portion of the second plurality of elongated guide members are each spaced apart from an adjacent one of the second plurality of elongated guide members by the second amount.

3. The assembly of claim 2 wherein the first amount is approximately 1.70 inches and the second amount is approximately 1.80 inches.

4. The assembly of claim 2 wherein the first and second portions of the first plurality of elongated guide members are alternatingly positioned along the first side of the wall and the first and second portions of the second plurality of elongated guide members are alternatingly positioned along the second side of the wall.

5. The assembly of claim 1 wherein the first plurality of elongated guide members are irregularly positioned along the first side of the wall and the second plurality of elongated guide members are irregularly positioned along the second side of the wall.

6. The assembly of claim 1 for use with a cable wherein each of the first plurality of spaces is configured to receive a portion of the cable therein and each of the second plurality of spaces is configured to receive a portion of the cable therein.

7. The system of claim 1 wherein the second end has grooves formed therein and each of the first plurality of teeth has an elongated protrusion configured to be received inside a different one of the grooves formed in the second end of the first like assembly, and
    the first end has grooves formed therein and each of the second plurality of teeth has an elongated protrusion configured to be received inside a different one of the grooves formed in the first end of the second like assembly.

8. An assembly for coupling with an equipment rack along a vertical dimension of the equipment rack, the assembly comprising:
    a wall having a first end, a second end, and a first dimension extending between the first and second ends;
    a plurality of elongated guide members being interspaced in juxtaposition along the wall between the first and second ends projecting from the wall, adjacent ones of the plurality of elongated guide members being spaced from one another by non-uniform distances along the first dimension;
    a first plurality of teeth alternatingly positioned along the first end to receive a second end of a first like assembly therebetween; and
    a second plurality of teeth alternatingly positioned along the second end to receive a first end of a second like assembly therebetween.

9. The assembly of claim 8 wherein the plurality of elongated guide members are irregularly positioned along the wall.

10. The assembly of claim 8 wherein a first portion of the plurality of elongated guide members are each spaced apart from an adjacent one of the plurality of elongated guide members by a first amount and a second portion of the plurality of elongated guide members are each spaced apart from an adjacent one of the plurality of elongated guide members by a second amount.

11. The assembly of claim 10 wherein the first amount is approximately 1.70 inches and the second amount is approximately 1.80 inches.

12. The assembly of claim 10 wherein the first and second portions of the plurality of elongated guide members are alternatingly positioned along the wall.

13. A system for coupling with an equipment rack along a vertical dimension of the equipment rack, the system comprising:
    a first assembly including:
        a wall having a first end and a second end, the first end having a first engagement portion; and
        a plurality of elongated guide members being interspaced in juxtaposition along the wall between the first and second ends projecting from the wall, the plurality of elongated guide members comprising a first pair of adjacent elongated guide members and a second pair of adjacent elongated guide members, the first pair of adjacent elongated guide members being spaced apart from one another by a first amount, and the second pair of adjacent elongated guide members being spaced apart from one another by a second amount, the first amount being different than the second amount; and
    a second assembly including:
        a wall having a first end and a second end, the first end having a second engagement portion configured to engage with the first engagement portion of the first end of the wall of the first assembly, the first engagement portion of the first assembly having teeth alternatingly positioned to form a channel to receive the wall of the second assembly, and the second engagement portion of the second assembly having teeth alternatively positioned to form a channel to receive the wall of the first assembly to position the system along the vertical dimension of the equipment rack; and
        a plurality of elongated guide members being interspaced in juxtaposition along the wall between the first and second ends projecting from the wall, the plurality of elongated guide members comprising a first pair of adjacent elongated guide members and a second pair of adjacent elongated guide members, the first pair of adjacent elongated guide members being spaced apart from one another by the first amount, and the second pair of adjacent elongated guide members being spaced apart from one another by the second amount.

14. The system of claim 13 wherein the teeth of the first assembly have elongated protrusions and the teeth of the second assembly have elongated protrusions, and wherein the wall of the first assembly has grooves to receive the elongated protrusions of the teeth of the second assembly and the wall of the second assembly has grooves to receive the elongated protrusions of the teeth of the first assembly.

15. The system of claim 13 wherein the first amount is approximately 1.70 inches and the second amount is approximately 1.80 inches.

16. The system of claim 13 wherein the plurality of elongated guide members of the first assembly comprises a third pair of adjacent elongated guide members like the first pair of adjacent elongated guide members and a fourth pair of adjacent elongated guide members like the second pair of adjacent elongated guide members, the first and third pairs being alternatingly positioned along the wall of the first assembly with the second and fourth pairs, and
    the plurality of elongated guide members of the second assembly comprises a third pair of adjacent elongated guide members like the first pair of adjacent elongated guide members and a fourth pair of adjacent elongated guide members like the second pair of adjacent elongated guide members, the first and third pairs being alternatingly positioned along the wall of the second assembly with the second and fourth pairs.

17. The system of claim 13 wherein the plurality of elongated guide members of the first assembly are irregularly positioned along the wall of the first assembly and the plurality of elongated guide members of the second assembly are irregularly positioned along the wall of the second assembly.

18. The system of claim 13 wherein
    the wall of the first assembly comprises a third engagement portion projecting therefrom, the plurality of elongated guide members of the first assembly projecting from the wall in a direction opposite of the projection of the third engagement portion,
    the wall of the second assembly comprises a fourth engagement portion projecting therefrom, the plurality of elongated guide members of the second assembly projecting from the wall in a direction opposite of the projection of the fourth engagement portion,
    the third engagement portion of the wall of the first assembly is configured to couple with the wall of the second assembly,
    the fourth engagement portion of the wall of the second assembly is configured to couple with the wall of the first assembly, and
    the wall of the first assembly is interspaced in juxtaposition with the wall of the second assembly.

19. The system of claim 18 wherein the wall of the first assembly has apertures, the wall of the second assembly has apertures, the third engagement portion of the first assembly includes pins each sized and positioned to be received by a different one of the apertures of the second assembly, and the fourth engagement portion of the second assembly includes pins each sized and positioned to be received by a different one of the apertures of the first assembly.

20. A system for coupling with an equipment rack along a vertical dimension of the equipment rack, the system comprising:
    a first assembly including:
        a wall having a first end and a second end, the first end having a first engagement portion; and
        a plurality of elongated guide members being interspaced in juxtaposition along the wall between the first and second ends projecting from the wall, the plurality of elongated guide members comprising a first pair of adjacent elongated guide members and a second pair of adjacent elongated guide members, the first pair of adjacent elongated guide members being spaced apart from one another by 1.70 inches and defining a gap therebetween that is less than 1.70 inches, and the second pair of adjacent elongated guide members being spaced apart from one another by 1.80 inches and defining a gap therebetween that is less than 1.80 inches; and
    a second assembly including:
        a wall having a first end and a second end, the first end having a second engagement portion configured to engage with the first engagement portion of the first end of the wall of the first assembly; and a plurality of elongated guide members being interspaced in juxtaposition along the wall between the first and second ends projecting from the wall, the plurality of elongated guide members comprising a first pair of adjacent elongated guide members and a second pair of adjacent elongated guide members, the first pair of adjacent elongated guide members being spaced apart from one another by 1.70 inches and defining a gap therebetween that is less than 1.70 inches, and the second pair of adjacent elongated guide members being spaced apart from one another by 1.80 inches and defining a gap therebetween that is less than 1.80 inches.

21. The system of claim 20 wherein the first engagement portion of the first assembly has teeth alternatingly positioned to form a channel to receive the wall of the second assembly, and the second engagement portion of the second assembly has teeth alternatingly positioned to form a channel to receive the wall of the first assembly to position the system along the vertical dimension of the equipment rack.

22. The system of claim 21 wherein the teeth of the first assembly have elongated protrusions and the teeth of the second assembly have elongated protrusions, and wherein the wall of the first assembly has grooves to receive the elongated protrusions of the teeth of the second assembly and the wall of the second assembly has grooves to receive the elongated protrusions of the teeth of the first assembly.

23. The system of claim 20 wherein the plurality of elongated guide members of the first assembly comprises a third pair of adjacent elongated guide members like the first pair of adjacent elongated guide members and a fourth pair of adjacent elongated guide members like the second pair of adjacent elongated guide members, the first and third pairs being alternatingly positioned along the wall of the first assembly with the second and fourth pairs, and the plurality of elongated guide members of the second assembly comprises a third pair of adjacent elongated guide members like the first pair of adjacent elongated guide members and a fourth pair of adjacent elongated guide members like the second pair of adjacent elongated guide members, the first and third pairs being alternatingly positioned along the wall of the second assembly with the second and fourth pairs.

24. The system of claim 20 wherein the plurality of elongated guide members of the first assembly are irregularly positioned along the wall of the first assembly and the plurality of elongated guide members of the second assembly are irregularly positioned along the wall of the second assembly.

25. The system of claim 20 wherein the wall of the first assembly comprises a third engagement portion projecting therefrom, the plurality of elongated guide members of the first assembly projecting from the wall in a direction opposite of the projection of the third engagement portion, the wall of the second assembly comprises a fourth engagement portion projecting therefrom, the plurality of elongated guide members of the second assembly projecting from the wall in a direction opposite of the projection of the fourth engagement portion, the third engagement portion of the wall of the first assembly is configured to couple with the wall of the second assembly, the fourth engagement portion of the wall of the second assembly is configured to couple with the wall of the first assembly, and the wall of the first assembly is interspaced in juxtaposition with the wall of the second assembly.

26. The system of claim 25 wherein the wall of the first assembly has apertures, the wall of the second assembly has apertures, the third engagement portion of the first assembly includes pins each sized and positioned to be received by a different one of the apertures of the second assembly, and the fourth engagement portion of the second assembly includes pins each sized and positioned to be received by a different one of the apertures of the first assembly.

27. The system of claim 20 wherein each of the first pair of adjacent elongated guide members of the first assembly has a projecting portion that projects from the wall of the first assembly and a distal portion spaced apart from the wall of the first assembly, the projecting portions of the first pair of adjacent elongated guide members of the first assembly being spaced apart from one another by 1.70 inches and defining a gap therebetween that is less than 1.70 inches, the distal portions of the first pair of adjacent elongated guide members of the first assembly extending toward one another to define a gap that is narrower than the gap defined between the projecting portions of the first pair of adjacent elongated guide members of the first assembly, and each of the second pair of adjacent elongated guide members of the first assembly has a projecting portion that projects from the wall of the first assembly and a distal portion spaced apart from the wall of the first assembly, the projecting portions of the second pair of adjacent elongated guide members of the first assembly being spaced apart from one another by 1.80 inches and defining a gap therebetween that is less than 1.80 inches, the distal portions of the second pair of adjacent elongated guide members of the first assembly extending toward one another to define a gap that is narrower than the gap defined between the projecting portions of the second pair of adjacent elongated guide members of the first assembly.

28. The system of claim 27 wherein each of the first pair of adjacent elongated guide members of the second assembly has a projecting portion that projects from the wall of the second assembly and a distal portion spaced apart from the wall of the second assembly, the projecting portions of the first pair of adjacent elongated guide members of the second assembly being spaced apart from one another by 1.70 inches and defining a gap therebetween that is less than 1.70 inches, the distal portions of the first pair of adjacent elongated guide members of the second assembly extending toward one another to define a gap that is narrower than the gap defined between the projecting portions of the first pair of adjacent elongated guide members of the second assembly, and each of the second pair of adjacent elongated guide members of the second assembly has a projecting portion that projects from the wall of the second assembly and a distal portion spaced apart from the wall of the second assembly, the projecting portions of the second pair of adjacent elongated guide members of the second assembly being spaced apart from one another by 1.80 inches and defining a gap therebetween that is less than 1.80 inches, the distal portions of the second pair of adjacent elongated guide members of the second assembly extending toward one another to define a gap that is narrower than the gap defined between the projecting portions of the second pair of adjacent elongated guide members of the second assembly.

* * * * *

UNITED STATES PATENT AND TRADEMARK OFFICE
CERTIFICATE OF CORRECTION

| | | |
|---|---|---|
| PATENT NO. | : 7,963,486 B2 | Page 1 of 1 |
| APPLICATION NO. | : 12/031648 | |
| DATED | : June 21, 2011 | |
| INVENTOR(S) | : Craig Wilson, Frank Chin-Hwan Kim and Brian Groenig | |

It is certified that error appears in the above-identified patent and that said Letters Patent is hereby corrected as shown below:

On the title page: Item (73)

The name of the Assignee should read --

Leviton Manufacturing Co., Inc.

Signed and Sealed this

Twenty-sixth Day of July, 2011

David J. Kappos
*Director of the United States Patent and Trademark Office*